United States Patent [19]
Hancock

[11] Patent Number: 4,757,432
[45] Date of Patent: Jul. 12, 1988

[54] SERIES RESONANT INVERTER WITH INTEGRATING FEEDBACK CONTROL LOOP

[75] Inventor: Donald J. Hancock, Thousand Oaks, Calif.

[73] Assignee: Hughes Aircraft Company, Los Angeles, Calif.

[21] Appl. No.: 560,343

[22] Filed: Dec. 12, 1983

Related U.S. Application Data

[63] Continuation of Ser. No. 322,134, Nov. 17, 1981, abandoned.

[51] Int. Cl.$^4$ .......................................... H02M 3/337
[52] U.S. Cl. ....................................... 363/17; 363/98
[58] Field of Search .................... 363/17, 40, 41, 98, 363/132, 16

[56] References Cited

FOREIGN PATENT DOCUMENTS 35679   4/1981  Japan ..................................... 363/16
2057168A 7/1980 United Kingdom .
2060220A 8/1980 United Kingdom .

OTHER PUBLICATIONS

Resonant Zero Crossover DC-to-DC Converter, R. W. Carlsten, Jan. 1980, IBM Technical Disclosure Bulletin, vol. 22, No. 8B.
DC-to-DC Power Converter, Q. L. Benedict, J. M. Joyce and W. R. Wheeler, Oct. 1980, IBM Technical Disclosure Bulletin, vol. 23, No. 5.

*Primary Examiner*—William H. Beha, Jr.
*Attorney, Agent, or Firm*—Wanda Denson-Low; V. G. Laslo; A. W. Karambelas

[57] ABSTRACT

Current flow in a transistorized series resonant inverter is switched in an inherently simple and stable manner by time integrating the difference between the electrical output and a reference and varying the switching frequency of the inverter so as to null the time integrated difference in a feedback control loop. Each transistor is on for about half the resonant period of the tank circuit so that it is cut off at or slightly after the zero-crossing of the sinusoidal collector current.

4 Claims, 5 Drawing Sheets

SERIES RESONANT INVERTER WITH INTEGRATING FEEDBACK CONTROL LOOP

This application is a continuation of application Ser. No. 322,134, filed Nov. 17, 1981 now abandoned.

TECHNICAL FIELD

The invention is an inverter for a power supply for converting one direct current voltage direct current voltage or another alternating current voltage, wherein power efficiency and stability are improved while greatly simplifying control circuitry.

RELATED APPLICATIONS

This patent application is related to U.S. Pat. application Ser. No. 256,380 filed Apr. 22, 1981 by Donald J. Hancock and Ronald R. Robson, entitled "Power Switch Drive Circuit" and assigned to the assignee of this application.

BACKGROUND ART

Transforming a voltage from a direct current (DC) power supply is typically accomplished by converting the direct current voltage to an alternating current (AC) voltage and then transforming it to the desired voltage. Means for converting the DC voltage to an AC voltage are well-known in the art, and typically comprise an inverter which functions to switch the voltage across a resonant tank circuit in order to create an AC sinusoidal voltage waveform, this voltage waveform then being applied across a transformer. The magnitude of the transformed voltage is controlled by the switching frequency of the inverter. Prior art inverters suffer from inherent disadvantages, including power loss due to switching transients and dynamic instability.

Recent proposals for inverters useful with solar powered ion propulsion systems are based upon an "intelligent" controller circuit in which the switching of the inverter is controlled in response to conditions existing during the previous switching cycle. The "intelligent" controller of the prior art is inherently unstable because its control is based upon the conditions existing in the previous switching cycle. Furthermore, it lacks the ability to switch the inverter output polarity precisely during periods of minimum current, causing significant switching power losses in the inverter.

One example of an "intelligent" controller is disclosed in Schwarz et al, "A 95% Efficient 1 Kilowatt DC Converter", *Power Electronics Specialists Conference Record*, 1977, pages 125–134. Such "intelligent" controllers are of a necessity complex, another disadvantage.

In some cases, prior art inverters are switched by silicon controlled rectifiers which require the application of a reverse current pulse every half cycle for a minimum period of time, further decreasing the power efficiency and limiting the frequency at which the inverter may be operated.

A purpose of the present invention is to increase the power efficiency of the inverter while at the same time improving its stability and simplifying the control circuitry associated therewith.

SUMMARY OF THE INVENTION

The present invention is a power supply inverter using a four-transistor switching network connected across a series resonant tank circuit. The bases of the transistors are turned on for a duration approximately equal to one-half the resonant period (or reciprocal of the resonant frequency) of the tank circuit. This feature of the invention guarantees that each of the transistors is switched during the period of minimum current through the inverter. Specifically, each transistor is switched off only when its sinusoidal collector current is at (or slightly after) the zero crossing point by a base drive circuit which generates an output voltage pulse train applied to the transistor base having a pulse width equal to about half the resonant period of the tank circuit.

Another feature is that the switching frequency of the base drive circuit varies according to the time integral of the difference signal between the output voltage of the inverter and a reference level. The switching frequency is controlled by a feedback control loop which constantly attempts to null the difference signal.

The feedback control loop of this invention is very stable because the time integral of the difference signal is an accumulated average and is therefore inherently insensitive to temporary aberrations otherwise giving rise to instability.

Presently, the invention is planned for use in transforming an input DC voltage to another DC voltage. However, the invention may be used to perform AC synthesis in which the reference voltage is itself an AC voltage rather than a constant voltage.

DESCRIPTION OF THE FIGURES

The invention is best understood by reference to the accompanying drawings, of which.

DETAILED DESCRIPTION OF THE INVENTION

Figure 1:
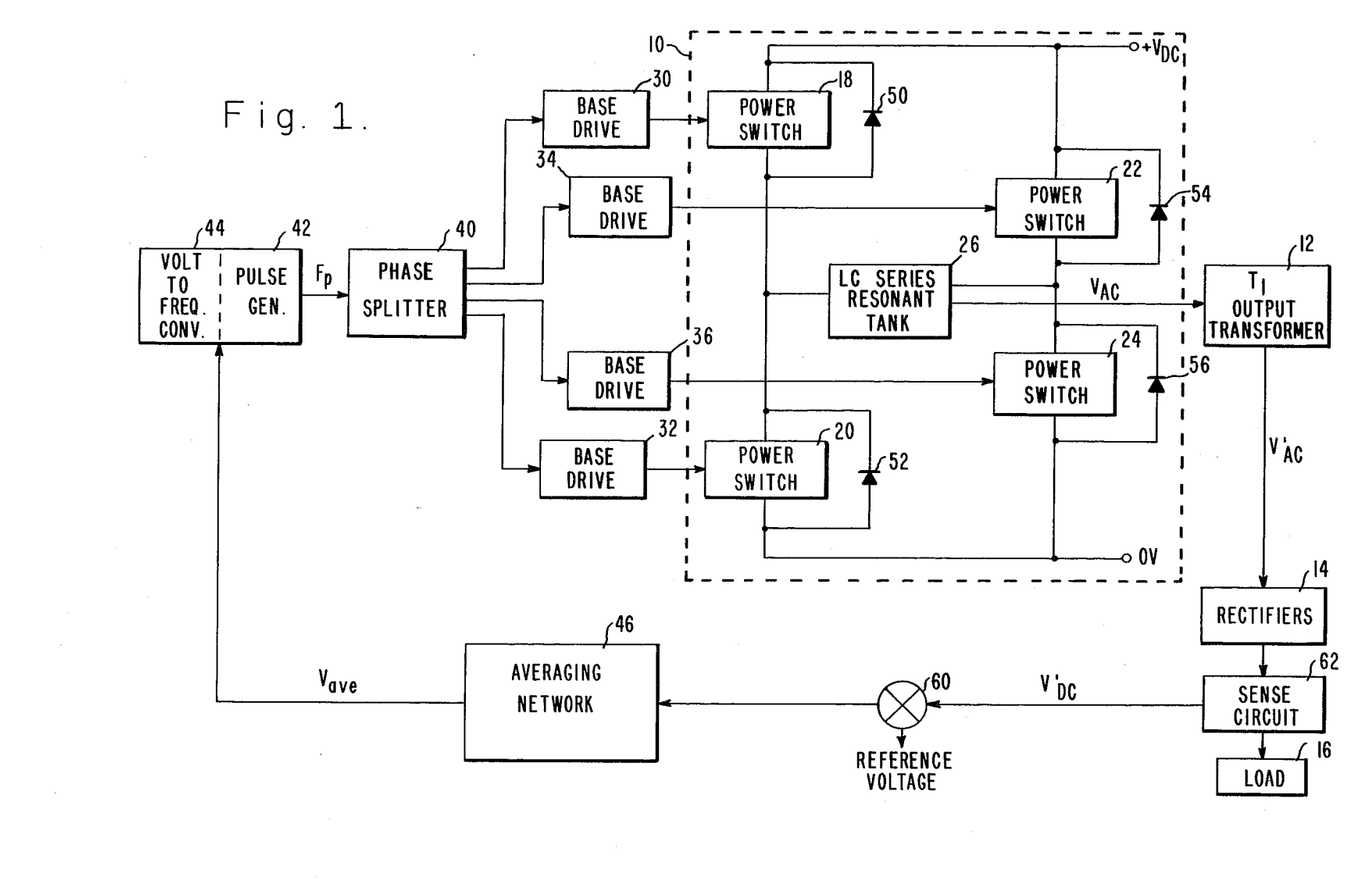
FIG. 1 is a block diagram illustrating the inverter and feedback control loop of the present invention.

In the inverter circuit 10 of FIG. 1, a DC voltage $V_{DC}$ is converted to an AC voltage $V_{AC}$, the AC voltage then being transformed in a transformer 12 to another AC voltage $V'_{AC}$ which is then rectified in a full-wave rectifier 14 to an output DC voltage $V'_{DC}$. The output voltage $V'_{DC}$ may be used to power a load 16. The inverter circuit 10 includes four bipolar power transistors 18, 20, 22, 24 connected in pairs in two parallel legs across a series resonant tank circuit 26. The series resonant tank circuit 26 comprises an inductor and a capacitor (not individually shown) connected in series. The transistors 18-24 are switched in complementary fashion so that the direction of current flow through the tank circuit 26 reverses once each cycle. In the first half of each cycle, the transistors 20, 22 are turned off while the transistors 18, 24 are turned on so that current flows through the tank circuit 26 in a first direction. During the second half of each cycle the transistors 18, 24 are turned off while the transistors 20, 22 are turned on so that current flows through the tank circuit 26 in the opposite direction. The output voltage $V'_{DC}$ is determined by the frequency at which the current is reversed or switched in the tank circuit 26. The base of each of the transistors 18-24 is connected to one of four base drive circuits 30-36. The base drive circuits 30-36 are controlled in a feedback control loop by a phase splitter 40, a pulse generator 42, a voltage-to-frequency converter 44 and an averaging network 46.

Switching Frequency Feedback Control Loop

The averaging network 46 generates a voltage $V_{ave}$ representing the time integrated difference between the output voltage $V'_{DC}$ and a selectable reference voltage $V_r$. The computed voltage $V_{ave}$ controls the pulse repetition frequency $F_p$ of the pulse generator 42 through the voltage-to-frequency converter 44.

The output of the pulse generator 42 is applied to the phase splitter 40. In response, the phase splitter 40 generates two complementary pulse trains of frequency $F_{AC} = \frac{1}{2}(F_p)$ of opposite phase with respect to one another. The pulse width of these pulse trains is constant. One of the complementary pulse trains is applied to the base drive circuits 32, 34 and the other to the base drive circuits 30, 36. In response, the base drive circuits 32, 34 apply a corresponding voltage pulse train to the bases of the transistors 20, 22, respectively, causing their base voltages to alternate together between an "on" and an "off" voltage at the frequency $F_{AC}$. Simultaneously, the base drive circuits 30, 36 apply a similar voltage pulse train of a complementary (or opposite) phase to the bases of the transistors 18, 24, causing their base voltages to alternate together between an "off" and an "on" voltage at the frequency $F_{AC}$ in a complementary manner.

The base drive circuits 30-36 described here may be readily implemented by a skilled worker. However, in this invention it is preferable to employ the type of base drive circuit described in the related Hancock and Robson patent application referenced above.

As the base voltage of each of the transistors 18-24 alternates between the "on" and "off" voltages, its emitter-to-collector current alternates between "on" and "off". Thus, the emitter-to-collector current in the transistor pair 18, 24 alternates in a complementary manner with respect to the emitter-to-collector current through the transistor pair 20, 22 at the frequency $F_{AC}$. Accordingly, the current through the tank circuit 26 is reversed at the switching frequency $F_{AC}$, giving rise to an alternating current (AC) voltage $V_{AC}$ in the tank circuit. The voltage $V_{AC}$ is transformed in the transformer 12 to another voltage $V'_{AC}$ having a magnitude determined by the switching frequency $F_{AC}$.

The transformed voltage $V'_{AC}$ is rectified in the rectifier 14 to the direct current (DC) output voltage $V'_{DC}$, which is then fed back through a voltage peak sensing circuit 62 to a subtraction node 60. The reference voltage $V_r$ is also applied to the subtraction node 60 so that the difference signal $V_r - V'_{DC}$ is applied to the averaging network 46. (The voltage peak sensing circuit 62 is of the conventional type and senses only the peak magnitude of the output voltage $V'_{DC}$.)

The averaging network 46 generates the integrated difference signal voltage $V_{ave}$, which is applied to the voltage-to-frequency converter 44, causing the frequency of the pulse generator 42 to change in proportion to the voltage $V_{ave}$. As a result, the switching frequency $F_{AC}$ of the inverter 10 changes under control of the base drive circuits 30-36 in such a manner as to null or reduce the difference $V_r - V'_{DC}$ sensed at the node 60. For example, if $V_{DC}$ exceeds $V_r$, the switching frequency $F_{AC}$ is reduced. If $V_{DC}$ is less than $V_r$, then switching frequency $F_{AC}$ is increased by the feedback control loop.

The change in switching frequency, $\Delta F_{AC}$, may be expressed as follows:

$$\Delta F_{AC} = (V_{ave}) C, \quad (1)$$

where C is a constant of proportionality characteristic of the voltage-to-frequency converter 42.

The averaging network 46 computes $V_{ave}$ as follows:

$$V_{ave} = K \int_0^t (V_r - V'_{DC}) e^{-t/\tau} dt, \quad (2)$$

where K and $\tau$ are constants.

Substituting equation (2) in to equation (1):

$$\Delta F_{AC} = KC \int_0^t (V_r - V'_{DC}) e^{-t/\tau} dt. \quad (3)$$

The switching frequency $F_{AC}$ is thus controlled in a simple feedback control loop 10, 14, 40, 42, 44, 46, 60, 62. Such simple feedback control loops are inherently stable because the average computation performed by the network 46 integrates the difference signal $V_r - V'_{DC}$ over many switching cycles of the inverter 10, thus minimizing the effect of temporary changes in voltage, a significant advantage.

Pulse Width Control

The problem of power losses due to switching transients in each of the transistors 18-24 is solved in the present invention by precisely controlling each of the transistors 18-24 so that it is turned on for a period of time about equal to one-half the resonant period (or reciprocal of the resonant frequency) of the tank circuit 26. The time domain waveform of the current through the tank circuit 26 corresponds to a sine wave of the resonant frequency of the tank circuit 26 which has zero amplitude (or "zero cross-over") twice during each resonant period. The constant pulse width of the voltage pulse train generated by each of the base drive circuits 30-36 is selected to be about one-half the resonant period of the tank circuit 26 by a simple design adjustment of the base drive circuits. As a result, each of the transistors 18-24 is turned off at or slightly after the moment of zero cross-over. The advantage is that each transistor 18-24 is switched with a minimum of collector current, so that the switching transient power loss is minimized. The efficiency of the inverter 10 is thus significantly improved. The adjustment of the pulse width of the base drive circuits 30-36 is made by a skilled worker using ordinary techniques which need not be described here.

Operation of the Inverter Circuit 10

Figure 3:
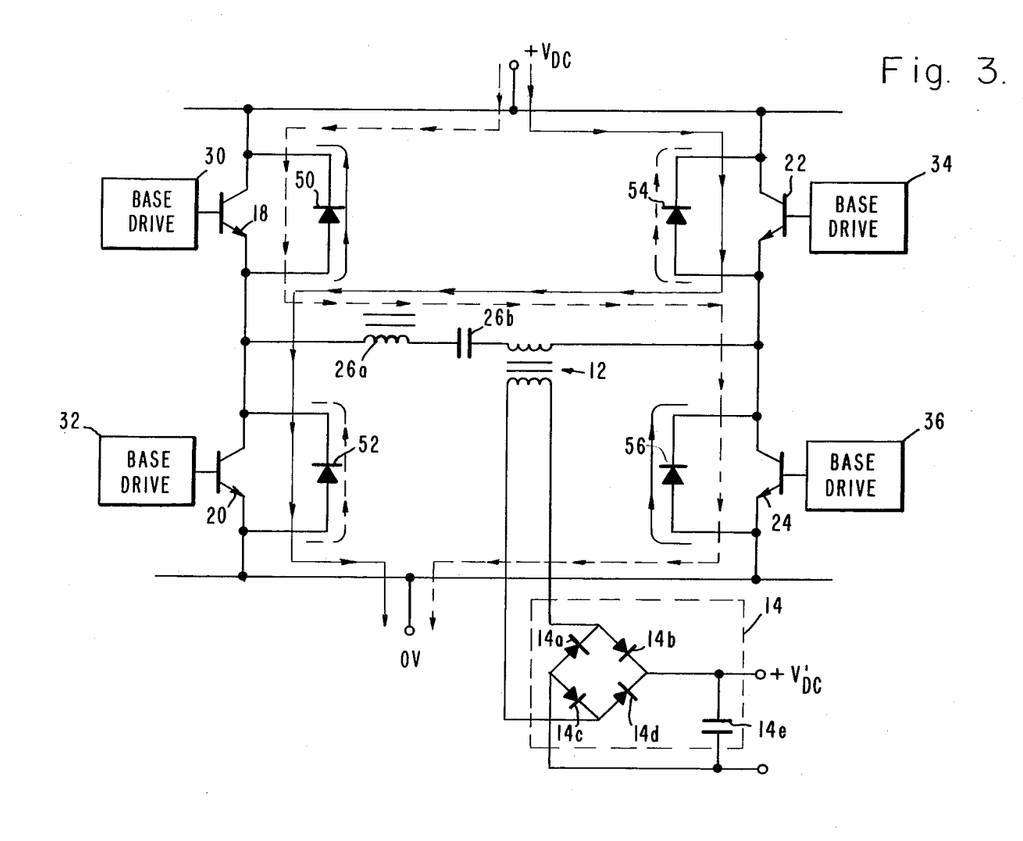
FIG. 3 is a simplified schematic diagram of the inverter of the present invention.

FIG. 3 is a schematic diagram illustrating a portion of the inverter power supply of FIG. 1 including the power switching transistors 18–24, diodes 50–56, the series resonant tank circuit 26, the rectifier circuit 14 and the base drive circuits 30–36. The tank circuit 26 includes an inductor 26a, a capacitor 26b and the output transformer 12. The rectifier circuit 14 includes four diodes 14a, b, c, d comprising a full-wave bridge rectifier and an output capacitor 14e.

Figure 2:
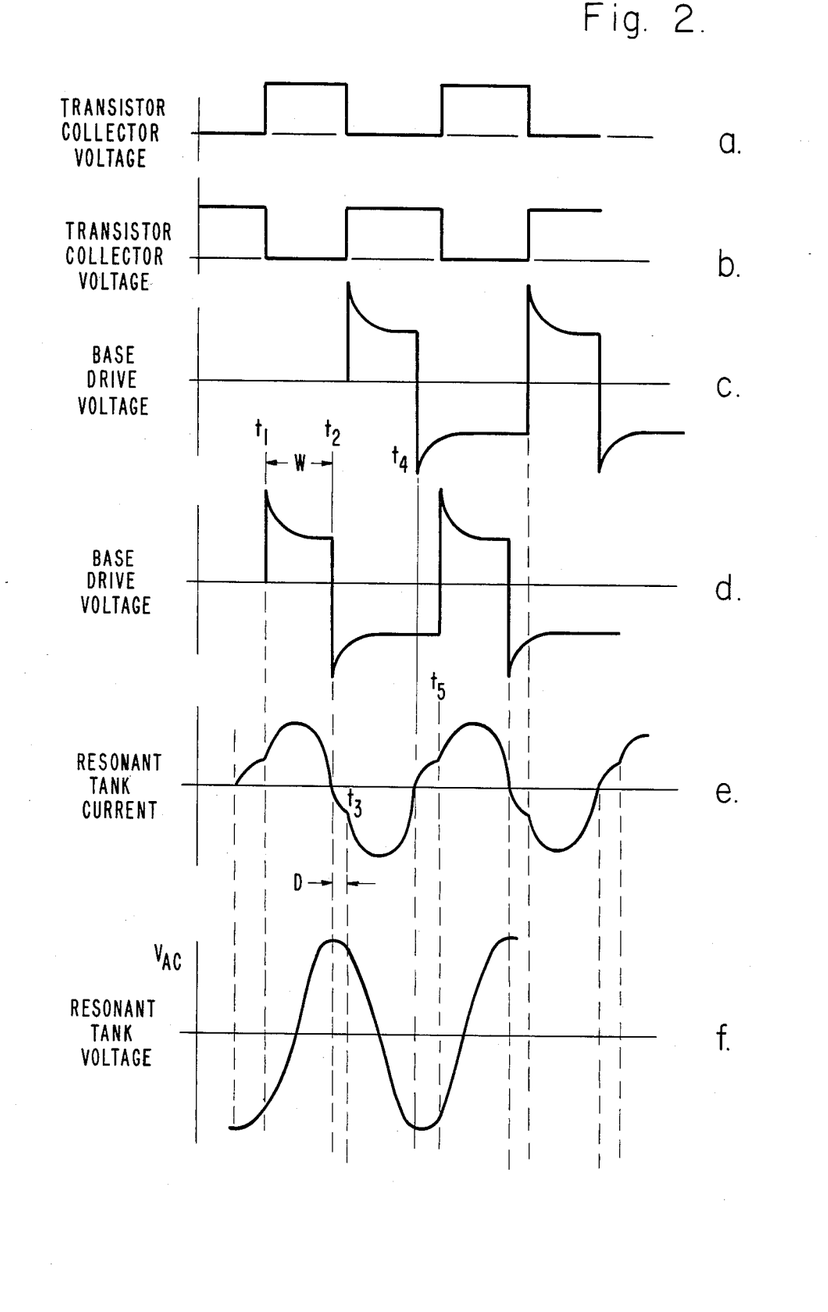
FIG. 2a illustrates the time domain waveform of the collector voltage of a first pair of transistors in FIG. 1.
FIG. 2b illustrates the time domain waveform of the collector voltage of a second pair of transistors in FIG. 1.
FIG. 2c illustrates the time domain waveform of the base drive voltages applied to the first pair of transistors in FIG. 1.
FIG. 2d illustrates the time domain waveform of the base drive voltages applied to the second pair of transistors in FIG. 1.
FIG. 2e illustrates the time domain waveform of the current through the resonant tank circuit of FIG. 1.
FIG. 2f illustrates the time domain waveform of the voltage across a capacitor in the resonant tank circuit of FIG. 1.

Operation of the inverter of FIGS. 1 and 3 is illustrated in the time domain waveforms of FIG. 2. The current through the tank circuit 26 is illustrated in FIG. 2e. The output voltage pulse train of the base drive circuits 30, 36 applied to the bases of the transistors 18, 24, respectively, is illustrated in FIG. 2c. The complementary output voltage pulse train of the base drive circuits 32, 34 applied to the bases of the transistors 20, 22, respectively, is illustrated in FIG. 2d. The pulse width W of each of the pulse trains of FIGS. 2c, 2d is about equal to one-half the resonant period T of the tank circuit 26 while the pulse repetition frequency is the switching frequency $F_{AC}$.

Operation of the inverter of FIG. 3 will now be described by simultaneous reference to FIGS. 2 and 3. At time $t_1$, the base drive circuits 32, 34 apply a positive voltage (FIG. 2d) to the bases of the transistors 20, 22 respectively, causing the collector voltage of each of the transistors 20, 22 (FIG. 2b) to drop to a minimum. Meanwhile, the base drive circuits 30, 36 maintain the transistors 18, 24 off so that current flows in the direction designated in solid line in FIG. 3. The capacitor 26b begins to charge at time $t_1$ as the voltage $V_{AC}$ across it increases, as illustrated in FIG. 2f. The current through the tank circuit 26 (FIG. 2e) follows a sinusoidal waveform from time $t_1$ to time $t_2$ having a resonant period T determined by the inductance of the inductor 26a and the capacitance of the capacitor 26b. The trailing edge of the base drive voltage waveform of FIG. 2d applied to the bases of the transistors 20, 22 occurs at time $t_2$ upon a zero crossing of the tank circuit current of FIG. 2e. The transistors 20, 22 are thus turned off at time $t_2$. Some current begins flowing in the opposite direction (dashed line) at time $t_2$ through the diodes 52, 54 connected in parallel with the transistors 20, 22 respectively. The current flow through the diodes 52, 54 discharges the capacitor 26b, and continues either until the voltage across the capacitor 26b is equal to the supply voltage $V_{DC}$ or until time $t_3$ when the transistors 18, 24 are turned on, whichever occurs first. The voltage $V_{AC}$ across the capacitor 26b therefore begins to decrease at time $t_2$ as illustrated in FIG. 2f.

At time $t_3$ the base drive circuits 30, 36 apply a positive voltage (FIG. 2c) to the bases of the transistors 18, 24 respectively, turning these transistors on so that their collector voltages decrease to a minimum as illustrated in FIG. 2a. This increases tank circuit current flow in the opposite direction. Accordingly, the capacitor voltage $V_{AC}$ continues to decrease further as illustrated in FIG. 2f. The delay D between times $t_2$ and $t_3$ is determined by the switching frequency $F_{AC}$, which in turn is determined by the selected reference voltage $V_r$, as described previously in connection with the feedback control loop of FIG. 1. If the output voltage $V'_{DC}$ were to exceed the reference voltage $V_r$, the delay D between time $t_2$ and $t_3$ would increase, while if the output voltage $V'_{DC}$ were to become less than the reference $V_r$, the delay D would decrease.

The tank circuit current of FIG. 2e continues to increase after time $t_3$ in the opposite direction indicated in dashed line FIG. 3, reaching a maximum and then decreasing until it reaches zero cross-over current at time $t_4$. At time $t_4$, the voltage of the base drive circuits 30, 36 changes so that the transistors 18, 24 are turned off. The capacitor 26b then discharges through the diodes 50, 56 as current begins to flow in the first (solid line) direction. Thus, the capacitor voltage $V_{AC}$ begins to increase at time $t_4$ as illustrated in FIG. 2f. At time $t_5$, the base drive circuits 32, 34 apply a positive voltage to the bases of the transistors 20, 22, respectively, thus increasing the current flow through the tank circuit 26 in the first direction. This completes one cycle of the operation of the inverter of FIG. 3.

A C Synthesis

While the invention has been described as generating an output DC voltage $V'_{DC}$ through the rectifier circuit 14, the invention may also be used to perform AC synthesis, wherein the output from the rectifier circuit 14 is itself an AC voltage, $V''_{AC}$, instead of the DC voltage $V'_{DC}$. This may be accomplished simply by substituting an AC reference voltage $V_r(AC)$ for the constant reference voltage $V_r$. It is contemplated that AC synthesis may be performed by the present invention as long as the frequency of the synthesized AC voltage $V''_{AC}$ is on the order of one tenth of the switching frequency $F_{AC}$.

PREFERRED EMBODIMENT OF THE INVENTION

Figure 4A:
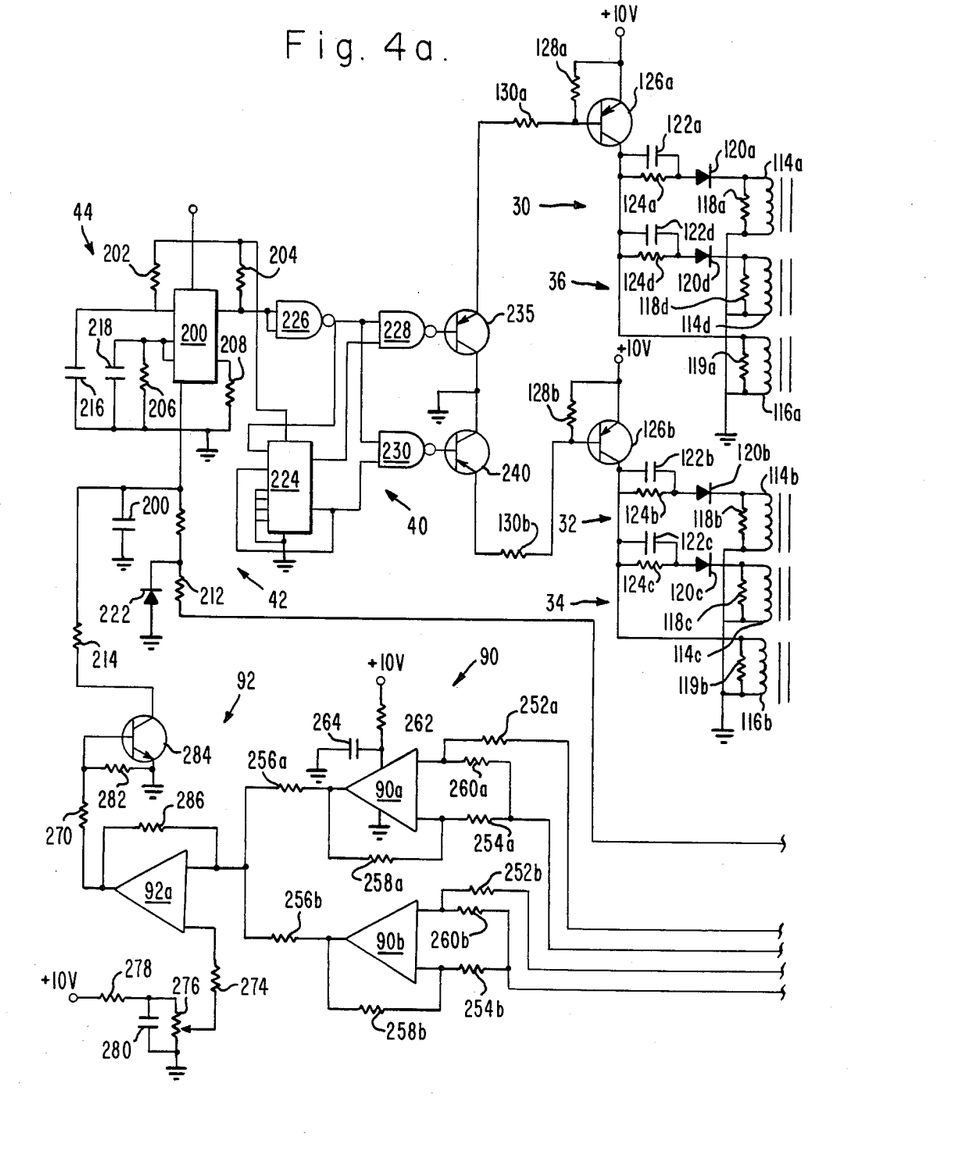
FIGS. 4a and 4b are detailed schematic diagrams illustrating the presently preferred embodiment of the invention.

A circuit illustrated in FIGS. 4a and b was built embodying the invention illustrated in FIGS. 1 and 3. Table I gives the part number or component value of certain key elements of the circuit of FIGS. 4a and b. Values not indicated are within the user's discretion.

TABLE

| ELEMENT | | | | | PART NUMBER OR COMPONENT VALUE |
|---|---|---|---|---|---|
| Base Drive Circuits | 30, 36 | | 32, 34 | | |
| (Shared Elements) | | | | | |
| Primary Winding | 116a | | 116b | | |
| Resistor | 119a | | 119b | | 5.6 kohms |
| Transistor | 126a | | 126b | | 2N2907 A |
| Resistor | 128a | | 128b | | 1 kohm |
| Resistor | 130a | | 130b | | 1.1 kohm |
| Base Drive Circuits | 30 | 32 | 34 | 36 | |
| (Individual Elements) | | | | | |
| Transistor | 100a | 100b | 100c | 100d | 2N5153 |
| Resistor | 101a | 101b | 101c | 101d | 10 ohms |
| Transistor | 102a | 102b | 102c | 102d | 2N5326 |
| Resistor | 103a | 103b | 103c | 103d | 56 ohms |
| Diode | 104a | 104b | 104c | 104d | 1N5806 |
| Secondary Winding | 110a | 110b | 110c | 110d | |
| Secondary Winding | 112a | 112b | 112c | 112d | |
| Primary Winding | 114a | 114b | 114c | 114d | |
| Resistor | 118a | 118b | 118c | 118d | 1.2 kohms |
| Diode | 120a | 120b | 120c | 120d | 1N5806 |
| Capacitor | 122a | 122b | 122c | 122d | .1µ farad |
| Resistor | 124a | 124b | 124c | 124d | 150 ohms |
| Inverter Circuit 10 | | | | | |
| Transistors 18, 20, 22, 24 | | | | | D60T (each) |
| Diodes 106a, b, c, d | | | | | 1N5806 (each) |
| Diodes 108a, b, c, d | | | | | 1N5806 (each) |
| Capacitors 105a, b, c, d | | | | | 100µ farad (each) |

TABLE-continued

| ELEMENT | PART NUMBER OR COMPONENT VALUE |
|---|---|
| Secondary Windings 238a, b, c, d | |
| Primary Winding 134 | |
| Negative Base Bias Supply 136 | −7 volts output |
| Resistors 137a, b | 0.1 ohm (each) |
| Tank Circuit 26 | |
| Inductor 26a | 80μ henries |
| Capacitor 26b | .12μ farad |
| Transformer 12 | |
| Primary Winding 144 | |
| Primary Winding 146 | |
| Secondary Winding 152 | |
| Secondary Winding 154 | |
| Rectifier 14 | |
| Bridge Diodes 150a, b, d, c | 1N5806 (each) |
| Output Diodes 156 a, b | 1N5806 (each) |
| Rectifying Capacitors 160a, b, c | 60μ farads (each) |
| Zener Diode 162 | |
| Triac Switch 164 | |
| Averaging Network 46 | |
| Differential Amplifier 170 | LM 358 |
| Resistors 172, 174, 176 | 10 kohms (each) |
| Differential Amplifier Compensating Network: | |
| Capacitors 178, 180 | |
| Resistors 182, 184 | |
| Bias Resistor 186 | 51 ohms |
| Filter Capacitor 188 | 1.0 A farad |
| Variable Resistor 190 | 5 kohms (maximum) |
| Diode 192 | |
| Voltage-To-Frequency Converter 44 | |
| Integrated Circuit 200 | 4152 V/F |
| Resistors 202, 204 | 10 kohms (each) |
| Resistor 206 | 91 kohms |
| Resistor 208 | 20 kohms |
| Resistor 210 | 510 kohms |
| Resistor 212 | 200 kohms |
| Resistor 214 | 20 kohms |
| Capacitor 216 | .001 farad |
| Capacitor 218, 220 | .01 farad (each) |
| Zener Diode 222 | |
| Pulse Generator 42 and Phase Splitter 40 | |
| Integrated Circuit 224 | CD4013 |
| Schmidt Trigger 226 | CD4093 |
| Schmidt Trigger 228 | CD4093 |
| Schmidt Trigger 230 | CD4093 |
| Transistor 235 | 2N2907A |
| Transistor 240 | 2N2907A |

Operation of the foregoing elements, including the base drive circuits 30–36, the inverter circuit 10, the tank circuit 26, the transformer 12, the rectifier 14, the averaging network 46, the voltage-to-frequency converter 44, the pulse generator 42 and the phase splitter 40 has already been described.

Figure 4B:
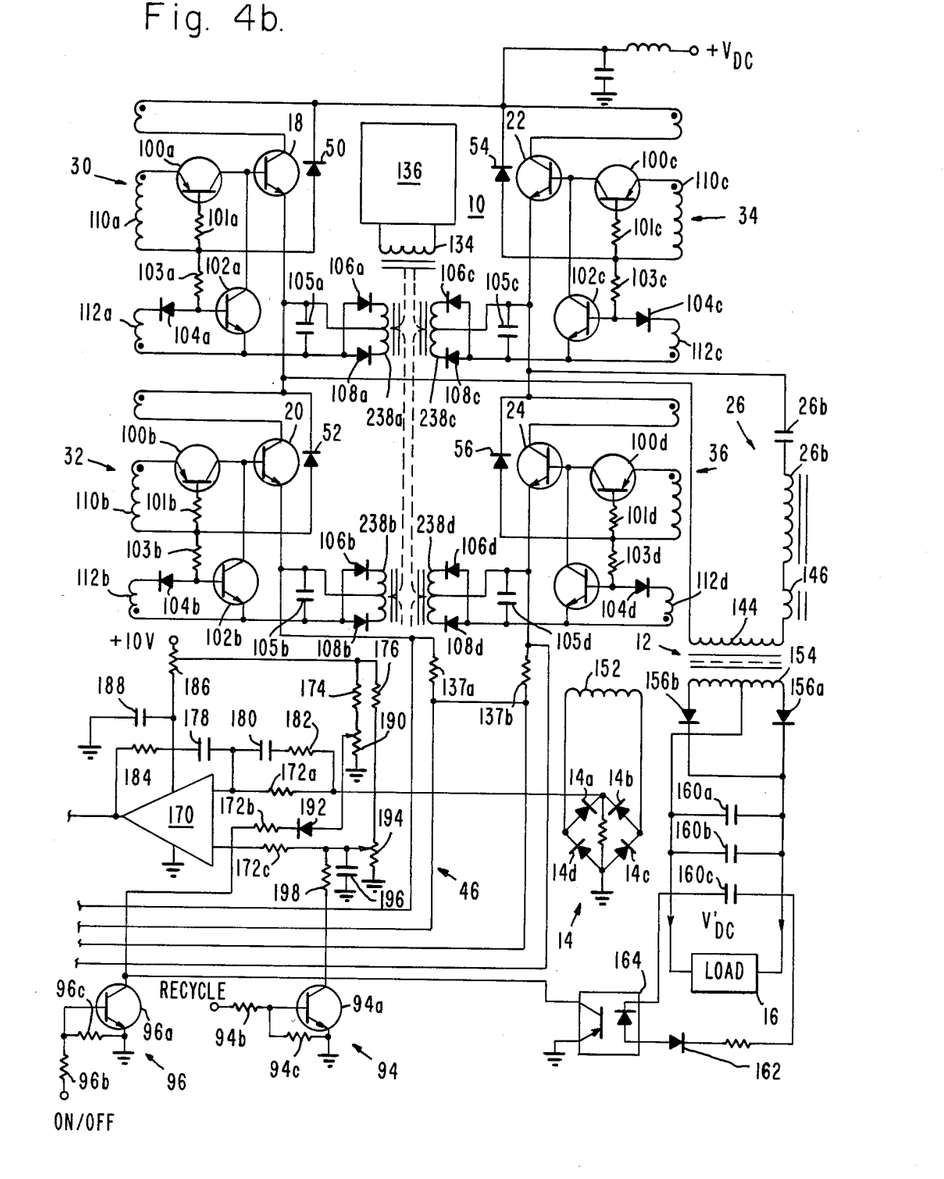

However, it is instructive to consider the operation of the averaging network 46 in the preferred embodiment of FIGS. 4a and b. A voltage derived from the inverter output voltage $V'_{DC}$ at the rectifier 14 is applied to the positive input of the differential amplifier 170 of the averaging network 46. This derived voltage is actually representative of the current flow through the inverter 10. The reference voltage $V_r$ is selected at the variable resistor 194 and is applied to the negative terminal of the differential amplifier 170. The difference voltage $V_r - V'_{DC}$ produced at the output of the differential amplifier 170 is integrated across the capacitor 178 and applied to the input of the voltage-to-frequency converter 44. The positive and negative inputs of the differential amplifier 170 thus function as the subtraction node 60 of FIG. 1.

The circuit of FIGS. 4a and b also includes the following conventional devices: an overcurrent amplifier 90, an overcurrent comparator 92, a recycle control 94 and an on/off switch 96 having the components set forth in Table II below.

TABLE II

| | PART NUMBER OR COMPONENT VALUE |
|---|---|
| Overcurrent Amplifier 90 | |
| Differential Amplifiers 90a, 90b | I.C. 358 |
| Resistors 252a, b; 254a b; 256a, b | 10 kohms (each) |
| Resistors 258a, b, 260a, b | 20 kohms (each) |
| Resistor 262 | 51 ohms |
| Capacitor 264 | 1μ farad |
| Overcurrent Comparator 92 | |
| Differential Amplifier 92a | I.C. 358 |
| Resistors 270, 274 | 10 kohms (each) |
| Variable Resistor 276 | 1 kohm (max) |
| Resistor 278 | 1 kohm |
| Capacitor 280 | 1μ farad |
| Resistor 282 | 4.7 kohms |
| Transistor 284 | 2N2222A |
| Resistor 286 | 100 kohms |
| Recycle Control 94 | |
| Variable Resistor 194 | 5 kohms (max) |
| Capacitor 196 | 28μ farads |
| Resistor 198 | 10 ohms |
| Transistor 94a | 2N2222A |
| Resistor 94b | 5.1 kohms |
| Resistor 94c | 1.0 kohms |
| On/Off Switch 96 | |
| Transistor 96a | 2N2222A |
| Resistor 96b | 5.1 kohms |
| Resistor 96c | 1.0 kohm |

Current through the inverter circuit 10 flows through the series resistors 137a and b. The differential amplifiers 90a, 90b, sense the voltage difference across the two resistors 137a, b, respectively, and generate output voltages proportional to the inverter current flow through them. These output voltages are summed at the output of the overcurrent amplifier 90 and applied to the positive input of the differential amplifier 92a comprising the overcurrent comparator 92. A reference voltage selected at the variable resistor 276 is applied to the negative input of the differential amplifier 92a. The difference voltage generated by the differential amplifier 92a is applied to the input of the voltage-to-frequency converter 44. As a result, if the inverter current exceeds a level defined by the reference voltage from the variable resistor 276, the comparator 92 changes the input voltage applied to the voltage-to-frequency converter 44 so as to reduce the switching frequency $F_{AC}$ and the inverter current.

The recycle control 94 and the on/off switch 96 halt operation of the inverter 10 by applying a reference voltage of zero volts to the positive terminal of the differential amplifier 170 in the averaging network 46.

What is claimed is:

1. A power supply comprising:
a resonant tank circuit including a series-connected capacitor and inductor through which current can flow, the tank circuit having a resonant frequency;
a transformer having a primary winding and a secondary winding, the primary winding being connected in series with the resonant tank circuit;
switching means for alternately applying a predetermined positive voltage and a predetermined negative voltage to the series-connected tank circuit and transformer primary winding, each such voltage application being for a duration substantially equal to one-half the inverse of the tank circuit's resonant frequency;

means for returning excess energy from the tank circuit to the source of the predetermined positive and negative voltages;

output voltage means connected to the transformer secondary winding, for providing an output voltage that varies in accordance with the frequency at which the switching means alternately applies the predetermined positive and negative voltages to the series-connected tank circuit and transformer primary winding;

means for comparing the output voltage with a predetermined reference voltage and for producing an error signal indicative of the time-averaged difference therebetween;

voltage-to-frequency converter means for producing a control signal having a frequency that varies in accordance with the error signal; and pulse generator means responsive to each cycle of the control signal, for generating pulse signals that condition the switching means to alternately apply the predetermined positive and negative voltages to the series-connected tank circuit and transformer primary winding.

2. A power supply as defined in claim 1, wherein the switching means includes:

a first pair of transistors connected to opposite sides of the series-connected tank circuit and transformer primary winding, for applying the predetermined positive voltage;

a second pair of transistors connected to opposite sides of the series-connected tank circuit and transformer primary winding, for applying the predetermined negative voltage;

a first pair of base drive circuits for switching on the first pair of transistors in accordance with a first pair of pulse signals generated by the pulse generator means; and a second pair of base drive circuits for switching on the second pair of transistors in accordance with a second pair of pulse signals generated by the pulse generator means.

3. A power supply as defined in claim 1, wherein the means for comparing includes:

differential amplifier means for comparing the output voltage with the reference voltage and for producing an instantaneous error signal that varies in accordance with the instantaneous difference therebetween; and averaging means for averaging the instantaneous error signal over time, to produce the time-averaged error signal for coupling to the voltage-to-frequency converter means.

4. A power supply as defined in claim 1, and further including means for sinusoidally varying the predetermined reference voltage, such that the power supply produces a corresponding sinusoidal output voltage.

* * * * *